March 15, 1932.   R. J. TALBOT   1,849,387
AUTOMOBILE SERVICING APPARATUS
Filed Nov. 7, 1930   7 Sheets-Sheet 1

INVENTOR,
Richard J. Talbot,
BY
Harry W. Bowen,
ATTORNEY.

March 15, 1932.  R. J. TALBOT  1,849,387
AUTOMOBILE SERVICING APPARATUS
Filed Nov. 7, 1930   7 Sheets-Sheet 2

INVENTOR,
Richard J. Talbot,
BY
Harry W. Bowen.
ATTORNEY.

March 15, 1932.  R. J. TALBOT  1,849,387
AUTOMOBILE SERVICING APPARATUS
Filed Nov. 7, 1930   7 Sheets-Sheet 3

INVENTOR,
Richard J. Talbot,
BY
Harry W. Bowen,
ATTORNEY.

March 15, 1932.    R. J. TALBOT    1,849,387
AUTOMOBILE SERVICING APPARATUS
Filed Nov. 7, 1930    7 Sheets-Sheet 5

INVENTOR,
Richard J. Talbot,
BY
Harry W. Bowen.
ATTORNEY.

March 15, 1932.  R. J. TALBOT  1,849,387
AUTOMOBILE SERVICING APPARATUS
Filed Nov. 7, 1930  7 Sheets-Sheet 6

Fig.11.

INVENTOR,
Richard J. Talbot,
BY
Harry W. Bowen,
ATTORNEY.

March 15, 1932.  R. J. TALBOT  1,849,387

AUTOMOBILE SERVICING APPARATUS

Filed Nov. 7, 1930  7 Sheets-Sheet 7

INVENTOR,
Richard J. Talbot,
BY
Harry W. Bowen.
ATTORNEY.

Patented Mar. 15, 1932

1,849,387

UNITED STATES PATENT OFFICE

RICHARD J. TALBOT, OF SPRINGFIELD, MASSACHUSETTS

AUTOMOBILE SERVICING APPARATUS

Application filed November 7, 1930. Serial No. 493,985.

My invention relates to improvements in automobile servicing apparatus, and more particularly to that type of apparatus which supplies gasoline or similar fuel and compressed air for filling a gasoline tank on a motor vehicle, or other receptacle, and for inflating the tires of the vehicle.

An object of my invention is to provide a device which will automatically vend and deliver fuel for the motor, without the necessity of an attendant.

A further object of my device is to provide a liquid fuel vending machine which receives its motive force from the weight of the vehicles which approach the filling station, transforming and storing this force which is derived from the weight of the vehicle, and utilizing said force and power, as needed.

Another object of my invention is to provide an apparatus which will maintain a continuous and accurate record of the quantity of fuel delivered and a statement of the sum of money received, and which will deliver to each individual purchaser a record of his purchase.

These and other objects will be more fully described and explained in the specifications with reference to the accompanying drawings, which set forth a preferred form of my invention.

Broadly, my invention comprises a platform located in the path of an approaching car, operative connecting means between the platform, a spring motor and an air compressor is provided whereby the spring motor is wound up and the air compressor operated, when weight is superimposed on the platform. A storage tank for compressed air is connected to an air compressor, a fuel storage tank, connecting means between the compressed air storage tank and the fuel storage tank; the air storage tank and an air hose, a fuel delivery apparatus comprising two fuel chambers, the spring motor, a recording apparatus operated by the spring motor, connecting means between the fuel storage tank and fuel chambers, a valve in said connecting means, controlled by the spring motor and means for controlling the operation of the spring motor alternately; first, by means of coin operation; and second, by the level of the fuel in the chamber or chambers.

A preferred form of my invention is illustrated in the accompanying drawings, in which:

Figs. 12 and 13 illustrate a modification; Fig. 13 being a sectional view on the line 13—13 of Fig. 12.

Referring to the drawings in detail, in which like numerals refer to like parts throughout:

The platform 1 is yieldingly supported on the coiled springs 2, four of which are shown, in the gear box 3. A rack 4, which is pivotally secured at 5 to the platform 1, engages the ratchet 6 which is secured to the shaft 7, rotatably mounted in the bearings 8. The shaft 9 is driven from the shaft 7 through the spur gears 10 and 11, and the shaft 12 is driven from the shaft 9 through the bevel gears 13 and 14. The rack 4 is normally held in engagement with the teeth of the ratchet 6 by means of the spring 15. When a wheel of a car rolls onto the platform 1, the weight of the car causes the platform to sink, thereby revolving the shafts 9 and 12. When the wheel leaves the platform, the coiled springs 2 operate to return the platform upward into its normal position. The ratchet wheel 7 is prevented from revolving in the opposite direction with the raising of the platform by the pawl 16, and the pivoted rack 4 is allowed to return with the platform and release itself from the teeth of the ratchet wheel by the spring 15. Thus, as one wheel after another passes over the platform, the shafts 9 and 12 are intermittently driven, and always in the same direction of rotation. The crank wheel 17, secured to and revolved by the shaft 12, actuates the crank link 18, which, in turn, drives the piston 19 in the air compressor 20. Air is forced into the air storage tank 21 through the connecting pipe 22 and check valve 23. A relief valve 24 on the compressor 20 maintains the pressure in the tank at any predetermined point. An air hose 25 is connected to the air storage tank 21 by the pipe 26 to provide air for tires or other purposes. The air storage tank 21 is connected to the fuel storage tank 27 by means of the pipe 28, in which is located the check valve 29, which maintains the air pressure in the fuel storage tank at a predetermined point appreciably lower than the pressure in the air storage tank 21. The fuel storage tank 27 is connected to the valve 30 in the vending device 31 by the pipe 32. (See Fig. 11.)

Figure 1:
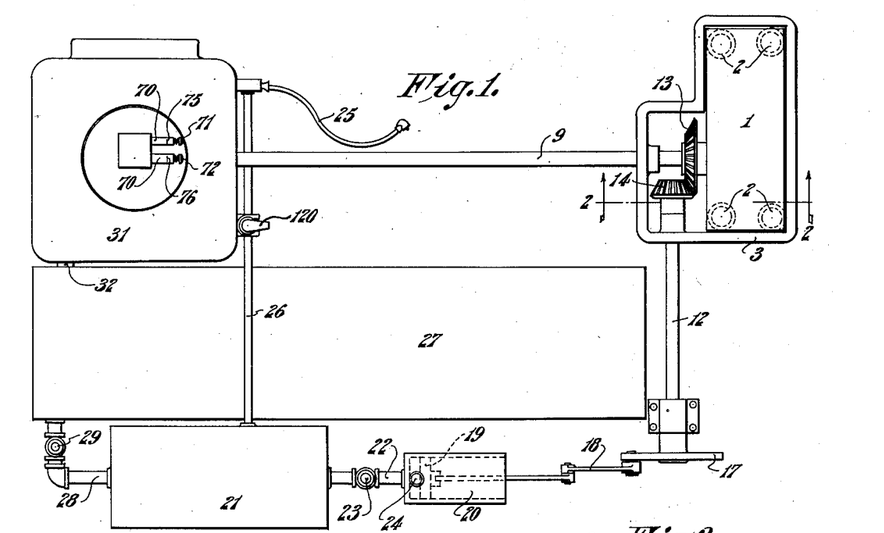
Fig. 1 is a plan view showing the platform, the air and fuel storage tanks, air compressor, and vending or delivery apparatus.
Figures 2, 3:
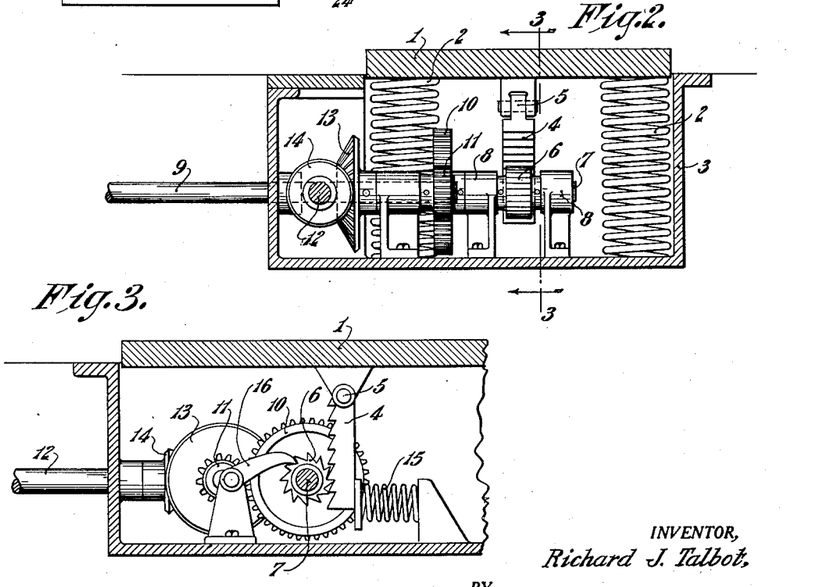
Fig. 2 is a vertical, sectional view on the line 2—2 of Fig. 1, through the platform showing the gearing actuated by the downward movement or sinking of the platform under a weight, as a motor vehicle.
Fig. 3 is a vertical, sectional view on the line 3—3 of Fig. 2.
Figure 4:
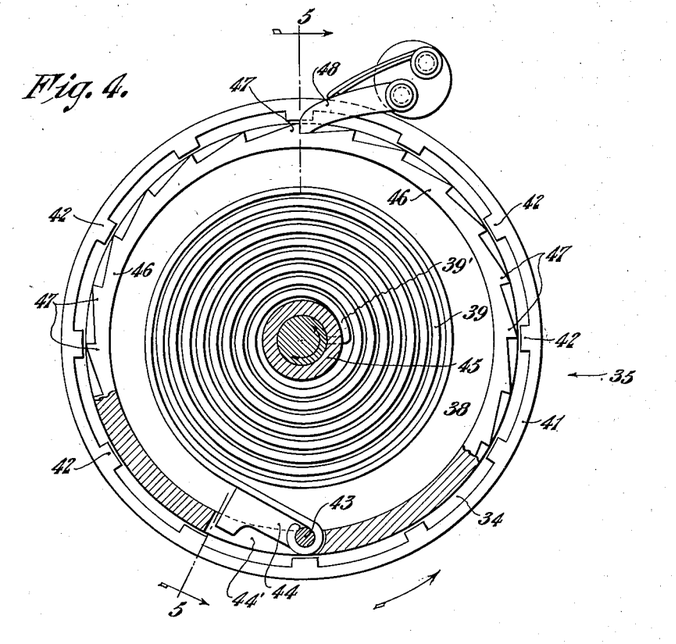
Fig. 4 is a detail plan view of the spring motor on the line 4—4 of Fig. 5.
Figure 5:
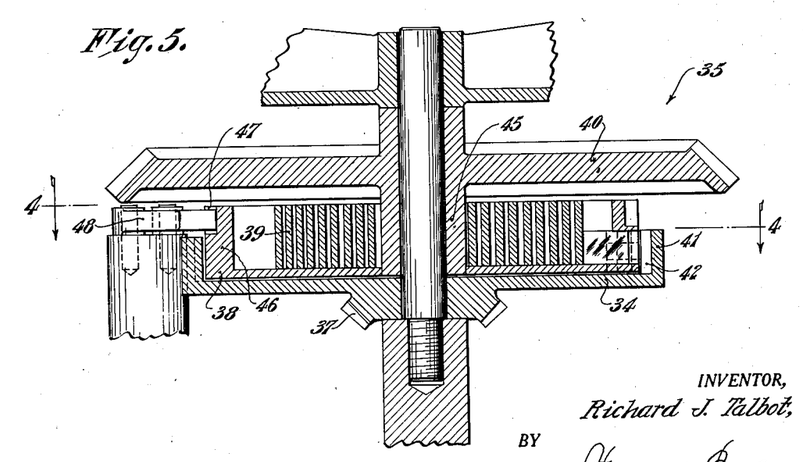
Fig. 5 is a vertical, sectional view on the line 5—5 of Fig. 4.

The shaft 9 enters the vending mechanism chamber 31 through the bearing 33, (Fig. 6), and, when the shaft 9 is revolved, it rotates the bottom plate 34 of the spring motor 35 through the bevel gears 36 and 37. The spring motor 35 comprises the bottom plate 34, of which the bevel gear 37 may be an integral part, the spring supporting base plate 38, heavy coil spring 39, and driving gear 40. The bottom plate 34 is formed with the upwardly extending flange 41, on the inner surface of which are formed the lugs 42. (See Fig. 4.) The outer end of the coil spring 39 is hinged to the supporting base plate 38 at 43, and the driving latch 44 is secured to the spring and hinge 43. The inner end 39' of the spring 39 is secured to the hub 45 of the gear 40. The spring supporting base plate 38 is formed with the annular flange 46, which extends above the top of the flange 41 on the bottom plate 34. Ratchet teeth 47, formed on the outer surface of the flange 46, are engaged by the pawl 48, thereby preventing the spring 39 from unwinding from the outer end. In operation, when the spring is unwound, the latch 44 is moved through the opening 44' in the flange 46, into engagement with one of the lugs 42. When the shaft 9 is revolved, thereby rotating plate 34, the plate 38 is revolved with plate 34, and the spring is wound up and placed under tension. When the spring 39 is wound up, the latch 44 is withdrawn, or released, from the opening 44' permitting the bottom plate 34 to revolve freely. Sufficient tension is constantly maintained in the spring 39, in order to drive the gear 40. The two bevel gears, 50 and 51, engage the gear 40. The gear 50 is connected through the gears 52 and 53 to the valve 30 and the fork-shaped escapement or control latch 54. Normally, the control latch 54 holds the shaft 55 from revolving, thereby preventing the gear 40 from revolving. When the latch 54 is released, the shaft 55 is allowed to revolve through 180° and as the gears 50 and 51 are equal in diameter, the shaft 56 also revolves through 180°. Gear 51 and shaft 56 drive the printing roll and paper roll; this operation will be explained in detail later on.

Figure 6:
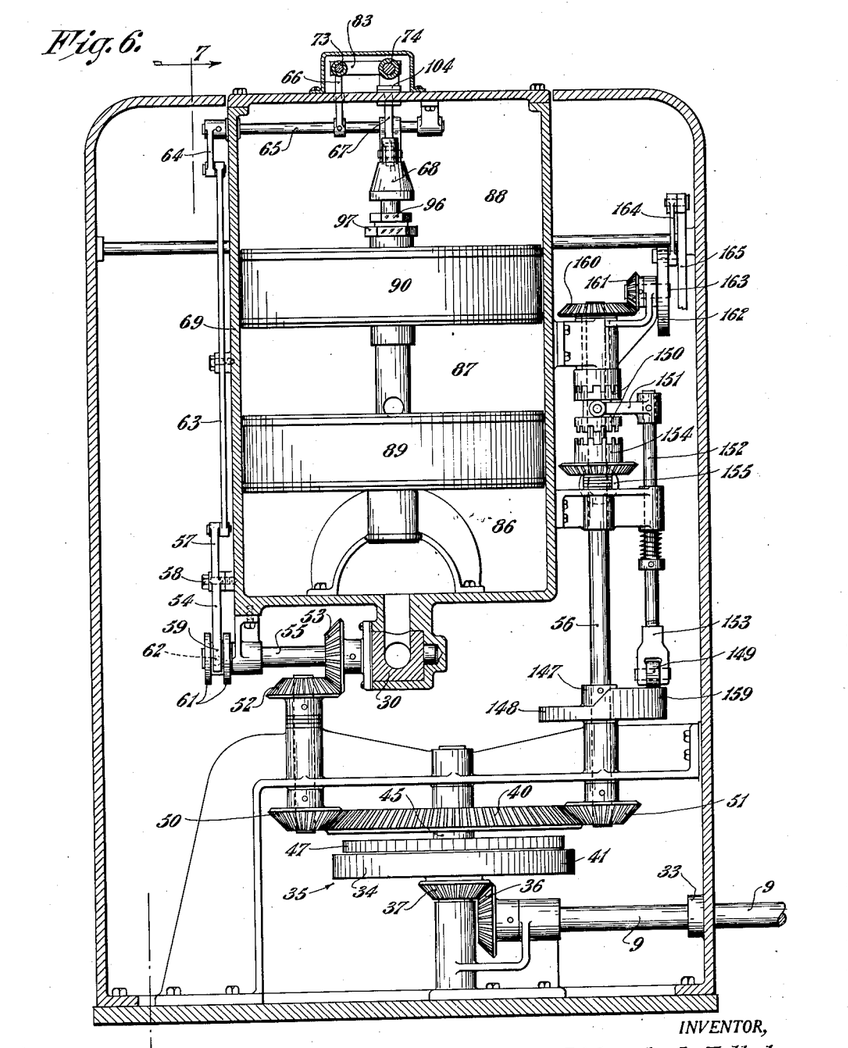
Fig. 6 is a vertical, sectional view of the fuel vending mechanism showing the fuel chambers, valve, spring motor, coin control, and driving means for the recording device.

The escapement control latch 54 is formed with the lever arm 57, pivoted at 58, and yoke 59. The yoke has formed at its ends inwardly extending stop lugs 60, guided between the flanges 61 on the shaft 55, which alternately engage the pin 62 that is secured to the shaft 55 and extends beyond it on one side. The escapement latch 54 is connected by levers 63 and 64 to the shaft 65, and, as the shaft 65 is caused to oscillate, either by coin lever or float cam, the latch 54 is caused to oscillate, and the shaft 55 revolves 180° until pin 62 is stopped by a lug 60 on the yoke 59.

The oscillation of the shaft 65 is brought about by means of the levers 66 and 67. The lever 66 is moved by a coin plunger and coin, designed for the purposes of this specification, as a fifty cent piece, and the lever 67 is moved alternately, first; by a coin plunger and coin, the latter described herein as a silver dollar, and second; by the float cone-shaped cam 68. The operation and construction of the silver dollar plunger and lever will be described later, it being understood that other coin levers with similar action may be used.

Figure 11:
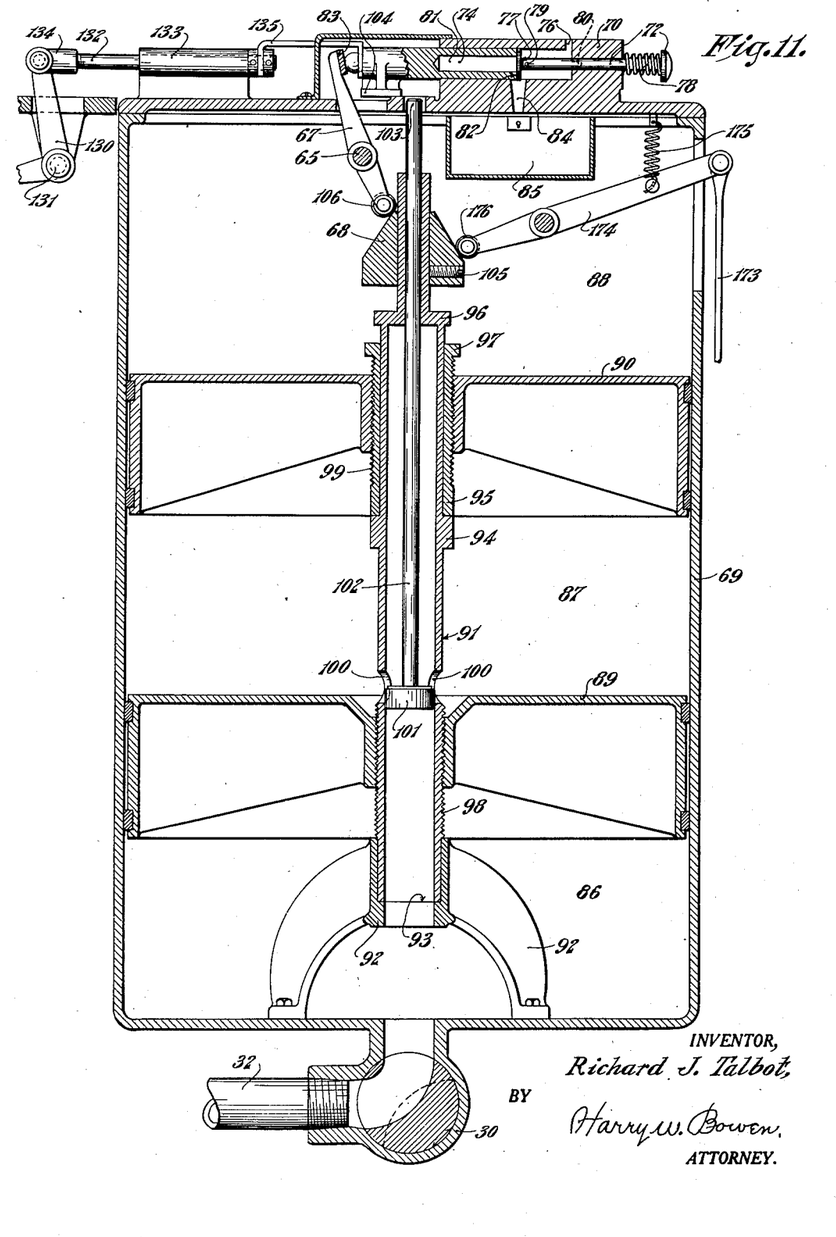
Fig. 11 is a vertical, sectional view of the fuel supply chambers and coin control, showing adjustment means for the fuel chambers and means for operating the control lever shaft alternately by coin and chambers.

The gasoline fuel tank 69 has formed on its upper end the boss 70 which provides bearings for the plungers 71 and 72, and the coin actuated cylinders 73 and 74. Slots 75 and 76 permit the insertion of a coin in the bearings 70. The plungers 71 and 72 are held normally with the ends 77 flush with the back of the coin slots 75 and 76 by springs 78 and pins 79 in slots 80. If a plunger is pushed in without inserting a coin, the end 77 enters the opening 81 in the cylinder 74, and no action results. If a coin is inserted, it will bear against the end 82 of the cylinder 74, and, as the plunger 72 is pushed, the cylinder 74 will be moved against the plate 83, which connects the levers 66 and 67, thereby oscillating the shaft 65. The escapement latch 54 is now moved, in the direction of the arrow 54' freeing the pin 62, and the shaft 55, which is driven by gearing from spring actuated gear 40, which revolves 180°, thereby opening the valve 30. Fuel now enters chamber 69 through valve 30 from the fuel storage tank 27, being forced into the chamber 69 by air pressure in this storage tank 27. When the plunger 72 is released, the coin drops through the slot 84 into the money drawer 85.

The fuel chamber 69 is divided into three compartments, 86, 87, and 88, with the inverted cup-shaped members 89 and 90. The cup 89 is supported on the tubular shaft 91, which has a bearing in the supporting foot bracket 92 and normally rests on the shoulder 93 of this bracket. A collar 94 is formed on the shaft 91 which supports the threaded sleeve 95, to which is adjustably attached the cup 90. Hexagonal heads 96 and 97 are formed on the hollow shaft 91 and threaded sleeve 95, whereby the cups 89 and 90 are adjustably secured to the shaft 91 and sleeve 95 by means of the threads 98 and 99 respectively. By turning the hexagonal heads 96 and 97, the cups 89 and 90 are raised or lowered to provide the proper quantity or amount of fuel required at current prices, as will be explained. Openings 100 are formed in the tubular shaft 91, which provide access to the chamber 87 and which are normally closed with the plunger valve 101. This valve is formed with a stem 102, the upper end, 103, of which impinges against the plate 104 on the cylinder 74, before a coin is inserted. If a 50¢ coin is used, the cylinder 74 is not moved, and the plate 104 remains over the end 103 of the valve stem 102, thereby maintaining the valve 101 in a closed position, and the chamber 86 only is filled with liquid fuel through the pipe 32. If, however, a silver dollar is used, the plate 104 is moved, as shown in Fig. 11; the valve 101 is raised by the pressure of the fuel entering the tubular member 91 and both chambers 86 and 87 are filled. As either one or both of the chambers 86 and 87 become filled, the cup 89, or both cups 89 and 90, are lifted by the pressure of the fuel, and the cam 68, which is adjustably secured to the hollow shaft 91, with the set screw 105, impinging against the roller 106 on the lever 67, thereby oscillating shaft 65 in the opposite direction to that caused by coin and plunger. This action oscillates escapement latch 54 in the opposite direction, allowing shaft 55 to revolve another 180°, thereby closing the valve 30.

Figure 7:
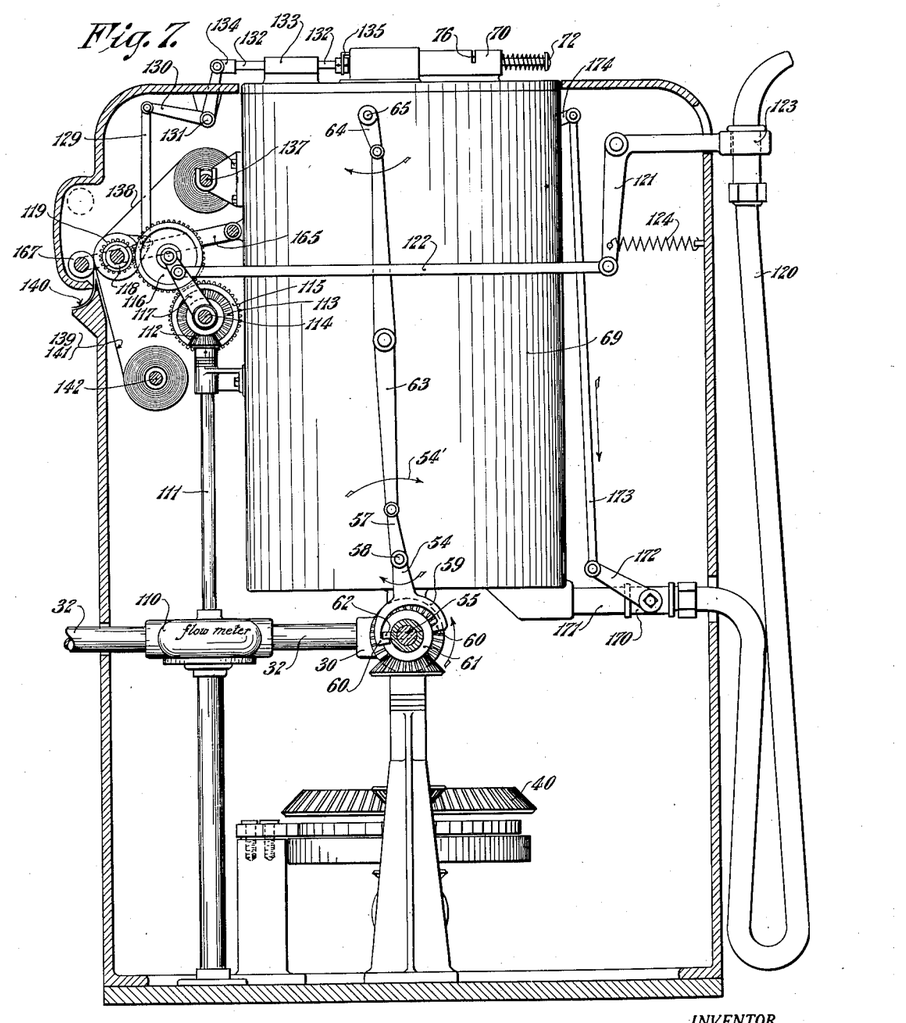
Fig. 7 is a vertical, sectional view on the line 7—7 of Fig. 6 showing the recording mechanism.
Figure 10:
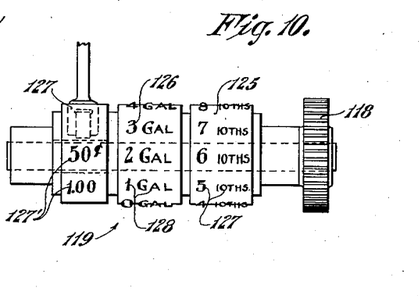
Fig. 10 is an elevational view of the recording cylinder.

A flow meter, 110, (see Fig. 7) is installed in the pipe 32 between the tank 27 and valve 30, is revolved by the fuel, as it enters the chambers 86 and 87, thus revolving the shaft 111 and bevel gears 112 and 113. The bevel gear 113 is secured to the shaft 114, to which is also secured the spur gear 115 which is in constant mesh with the spur gear 116. The gear 116, which is pivotally supported on the shaft 114 as a center on the arm 117, normally engages the gear 118 on the recording cylinder 119. The gears 116 and 118 are held normally in mesh by reason of the weight of the fuel delivery hose 120, acting through the supporting fork 123 on the bell crank lever 121 and link 122 connected to the arm 117. When the hose is removed from the supporting fork 123, the spring 124 withdraws the gear 116 out of mesh with gear 118, and these gears remain out of engagement until the hose is returned to the fork 123. The recording cylinder 119 is made in three sections, 125, 126, and 127. (See Fig. 10.) Sections 125 and 126 are connected together in a ratio of 10 to 1, and driven by the flow meter 110 through gears 112, 113, 115, 116 and 118. Raised figures, 127 and 128, indicate the amount of fuel entering the chambers 86 and 87 in tenths of gallons and gallons, respectively. The third section 127, upon which are the raised figures 127', is normally held in position to register a 50¢ sale by the levers 129 and 130. The lever 130, which is pivotally supported at 131, is secured to the rod 132, slidably mounted in the bearing 133, and is connected to the fork 134. The rod 132 is in turn connected to the cylinder 74 with the link 135. When a silver dollar is inserted in the opening 76 and the plunger 72 pushed, the section 127 of the recording cylinder 119 is actuated by levers 129, 130 and 131, rod 132, and link 135 is revolved approximately a quarter turn, bringing the figure of $1.00 into a recording position. When the cam 68 is raised, returning cylinder 74 to its normal position, this action is reversed, and the figures 50¢ again assume a recording position. The sections 125 and 126 are hollow, and weights 136 are secured to the inside of these sections, so placed as to return the sections 125 and 126 to a position with zero in the recording position when the gear 118 is released by the removal of the hose 120. The shaft 137 supports a roll of paper 138 which comprises two layers of paper 139 and 140 with a layer of double carbon 141 between. The three layers, 139, 140 and 141 pass over the recording cylinder 119, and the layer 139 and carbon 141 are passed downward and secured to the shaft 142. The outer layer of paper 140 is guided through the slot 143 into the delivery opening 144. When the printing roll 167 is forced downward over the recording cylinder 119, the pressure between rolls 167 and 119 causes the double carbon 141 to make an impression of the raised figures on the recording cylinder on the two layers of paper 139 and 140. The customer then pulls out the printed section of the layer 140, tearing it off against the knife edge 146 of the slot 143. This action causes a slack to exist in the layers 138, which relieves tension on the recording roll 119, allowing it to return to normal gear position, when gear 118 is freed. This slack is taken up, a fresh tab inserted in delivery opening 144 and the layer 139, and carbon 141 wound on shaft 142, to be retained for company records, when the shaft 142 is revolved by the spring motor gear 40, as will be explained.

Figure 8:
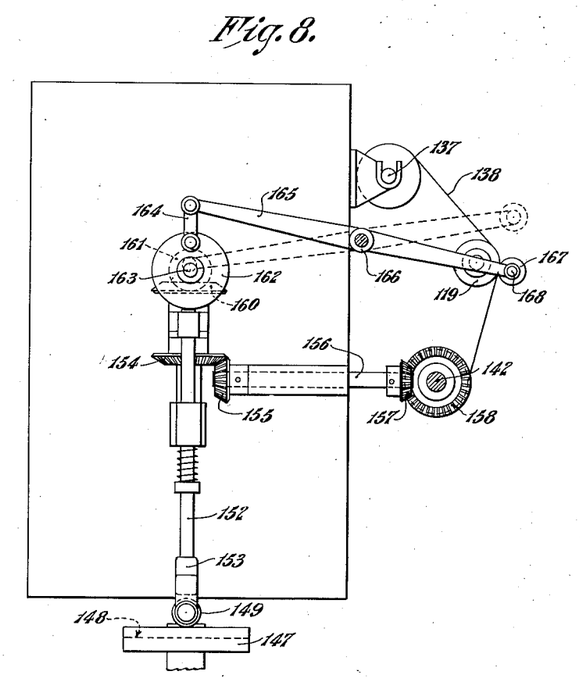
Fig. 8 is a diagrammatic view showing the operating means for operating the printing roller and rolls of paper.
Figure 9:
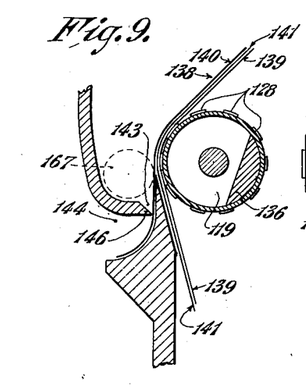
Fig. 9 is a detailed, sectional view through the recording cylinder and delivery slot for the ticket.

When the control latch 54 is oscillated, allowing gear 40 to revolve gear 50 through 180°, gear 51 and shaft 56 are also revolved one-half turn. The cam 147 is so positioned and secured to the shaft 56 as to bring the lower half 148 in engagement with the roller 149, when the latch 54 is actuated by a coin and the valve 30 thereby opened. Thus the clutch 150 engaged by the fork 151, which is secured to the roller 149 by shaft 152 and 153, is brought into engagement with gears 154 and 155. Gear 155 through shaft 156, (see Fig. 8), and gears 157 and 158 revolve the shaft 142, thereby winding on the layers 139 and 141, and taking up the slack caused by pulling downward on the layer 140. When the control latch 54 is oscillated by the float cam 68, the roller 149 now rides on the upper half 159, and the yoke 151 throws the clutch 150 into engagement with gears 160 and 161. The gear 161 is secured to the disc 162 by the stud 163. The gears 160 and 161 are in the ratio of 2 to 1, therefore, as gear 160 makes one-half revolution, gear 161 makes one full revolution. A crank arm 164, attached at one end to the disc 162, and at the other to lever 165, pivotally supported by the shaft 166, moves the printing roll 167, secured to the opposite end 168 of the lever 165, downward across the recording cylinder and up again as the disc 162 makes one full revolution.

A quick opening valve 170, located in the connecting pipe 171 between the chamber 69 and hose 120, is held normally closed by the lever 172, link 173, lever 174, and spring 175. As the float cam 68 is raised, it actuates the lever 174 by impinging on the roller 176 secured to the lever 174, thereby opening the valve 170. Thus, no fuel may be delivered through the hose 120, until the chamber 86, or chambers 86 and 87, as the case may be, are filled and the valve 30 closed.

Figure 12:
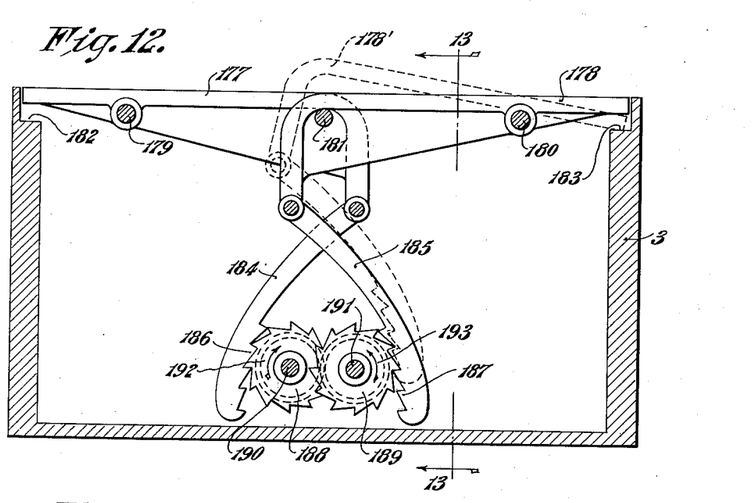
Figure 13:
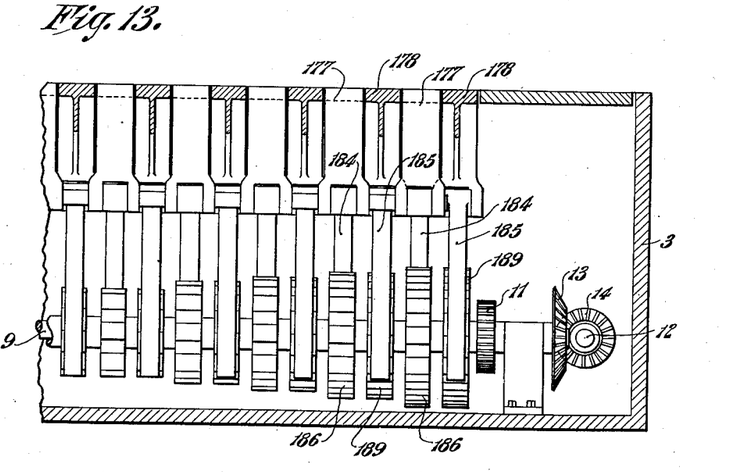

Referring now to the modified motive structure, shown in Figs. 12 and 13, 177 and 178 designate two bell-crank levers which constitute platform bars that are engaged by the oppositely located wheels of a motor vehicle as it passes over the same. These levers are each pivotally mounted on the longitudinally extended rods 179 and 180. A rod common to the two bars 181 limits the downward movements of these levers; their opposite or outer ends engage the shoulder surfaces 182 and 183 which serve to limit their downward movements at these ends, when a vehicle wheel engages the bars at or near their outer ends. Pivotally connected to these bars are the toothed pawls 184 and 185, the teeth 186 and 187 of which engage the teeth of the ratchet wheels 188 and 189, that are secured to the shafts 190 and 191. These shafts are geared together and operate to drive the power shaft 9 in the same direction; one of the gears is shown at 11. When the bar 177 is depressed, the shaft 190 is rotated in the direction of the arrow 192, and when the bar 178 is depressed, the shaft 191 is rotated in an opposite direction, but since these shafts are geared to the common power drive shaft 9, it is constantly driven in the same direction. Should one bar be depressed at different times or rate of motion, the pawls 184 or 185 will simply move idly over the teeth of the ratchet wheels. It will be observed from Fig. 13 that the ratchet wheels 188 and 189 are of different or graduated diameters. The purpose of this construction is to compensate for the effects of momentum due to the effects of a sudden or impulsive motion being imparted to the bars which set the shafts in motion. Unless some means can be provided to lessen this effect, breakage of parts might occur. By graduating or varying the angular movements of the ratchet wheels, this effect is materially reduced. The larger ratchet wheel, being the first one set in motion, will have less angular movements than the smaller wheels; therefore, as a vehicle passes from one end to the other of the casing 3, the bars 177 and 178, when depressed, will, in succession, impart a continuous and gradually increasing movement to the shaft 9. An important result of the construction shown in Figs. 12 and 13 is a large extent of movement of the inner ends of the bars, as shown by the dotted line 178'.

Briefly, the action is as follows: a purchaser inserts a coin and pushes a plunger 73 or 74, the spring motor, deriving its power from the weight of the purchaser's car, opens the inlet valve 30; fuel flows into the chamber 86 turning the recording cylinder, fresh paper is presented across the recording cylinder 119; the chamber, when filled with fuel, automatically closes the valve 30. The printing roll 167 is passed across the recording cylinder 119; the valve 170 in the delivery hose 120 is now opened, when the delivery hose, removed from the fork 123, releases the recording cylinder, the hose 120 is now placed in the fuel tank of the purchaser's car and the fuel delivered; the purchaser pulls out and tears off his printed record of purchase in the delivery opening 144.

Thus, I have provided an automatic fuel vending apparatus which vends fuel, collects for the same, and records the transaction, without requiring either attendance or power on the part of the servicing company.

What I claim is:

1. In combination, in a liquid fuel dispensing mechanism, of a motor, an escapement device for maintaining the motor inoperative, a coin receiving device for releasing the escapement mechanism to permit the motor to operate, a receptacle for receiving the fuel, a valve normally in a closed position, but moved to an open position when the motor is operated to admit a quantity of the fuel into the receptacle corresponding to the purchase price of the coil inserted, and means for automatically closing the valve by the admitted fuel.

2. In combination, in a liquid fuel dispensing mechanism, of a motor, an escapement device for maintaining the motor inoperative, a coin receiving device for releasing the escapement mechanism to permit the motor to operate, a receptacle for receiving the fuel, a valve normally in a closed position but moved to an open position when the motor is operated to admit a quantity of the fuel into the receptacle corresponding to the purchase price of the coin inserted, and means for automatically closing the valve by the admitted fuel, said means including a plunger in the receptacle, a can carried by the plunger, and operative means for stopping the motor and closing the valve.

3. In a fuel dispensing mechanism, a container tank, a supply pipe, a valve therein, a motor driven by means of the weight of a vehicle, an escapement mechanism which normally retains the motor inoperative, a device actuated by a coin to release the escapement for opening the valve, a fuel delivery mechanism, means for recording the quantity of fuel delivered, and means for closing the valve after the quantity of fuel admitted to the tank corresponds to the purchase price of the coin.

4. In a fuel dispensing mechanism, a container tank, a supply pipe, a valve therein, a motor driven by means of the weight of a vehicle, an escapement mechanism which normally retains the motor inoperative, a device actuated by a coin to release the escapement for opening the valve, a fuel delivery mechanism, means for recording the quantity of fuel delivered, and means for closing the valve after the quantity of fuel admitted to the tank corresponds to the purchase price of the coin, said means including a plunger in the tank and operative connecting means between the plunger and the valve.

5. In a device for the purpose described, a casing, movable bars mounted therein, a motor, operatively connected to the bars, the bars being actuated by the weight and movement of a motor vehicle passing over the bars.

6. In a device for the purpose described, a casing, movable bars mounted therein, a motor, operatively connected to the bars, the bars being actuated by the weight and movement of a motor vehicle passing over the bars, a fuel supply tank, an air receiving tank connected to the fuel tank, a fuel measuring and receiving tank, means for admitting fuel from the supply tank to the measuring tank including an escapement device to release the motor and a coin receiving mechanism to operate the escapement device, and means for recording the quantity of fuel delivered in dollars and cents.

7. In combination, in a fuel dispensing mechanism, a receptacle, a control valve therefor, a spring motor, a plurality of depressible members located in the line of travel of a motor vehicle, operative connecting means between the motor and the depressible members for placing the motor in a wound up condition, means for releasing the stored energy of the motor, including an escapement device, coin means for actuating the escapement device and valve, and means for causing the motor to come to rest, after a definite quantity of the fuel has flowed into the receiving receptacle.

8. In combination, in a fuel dispensing mechanism, a receiving receptacle, a control valve therefor, a spring motor, a plurality of depressible members located in the line of travel of a motor vehicle, operative connecting means between the motor and the depressible members for placing the motor in a wound up condition, means for releasing the stored energy of the motor, including an escapement device, coin means for actuating the escapement device and valve, and means for causing the motor to come to rest, after a definite quantity of the fuel has flowed into the receiving receptacle, said last mentioned means comprising a plunger in the receiving receptacle, and operative connecting means between the escapement device and the plunger.

9. In a fuel dispensing mechanism, a receiving receptacle, a supply receptacle, a pipe connecting the two receptacles, a valve in the pipe, a motor for opening and closing the valve, escapement means for maintaining the motor inoperative but permitting it to operate to open the valve, a coin device for releasing the escapement means, means for recording the quantity of fuel which flows into the receiving receptacle comprising a printing roller, a record tape, a let-off and take-up device for the tape, means for rendering the same operative when the valve is open, and means for printing the record on the tape when the valve is closed.

10. In a fuel dispensing mechanism, a receiving receptacle, a supply receptacle, a pipe connecting the two receptacles, a valve in the pipe, a motor for opening and closing the valve, escapement means for maintaining the motor inoperative but permitting it to operate to open the valve, a coin device for releasing the escapement means, means for recording the quantity of fuel which flows into the receiving receptacle comprising a printing roller, a record tape, a let-off and take-up device for the tape, means for rendering the same operative when the valve is open, means for printing the record on the tape when the valve is closed, a draw-off delivery pipe, a valve therein, a delivery hose, means for supporting the same, the hose being connected to the valve in the delivery pipe which is opened when the receiving receptacle is filled, and means connected to the hose for permitting the recording cylinder to return to zero position.

11. In a fuel dispensing mechanism, a receiving receptacle, a supply receptacle, a pipe connecting the two receptacles, a valve in the pipe, a motor for opening and closing the valve, escapement means for maintaining the motor inoperative but permitting it to operate to open the valve, a coin device for releasing the escapement means, means for recording the quantity of fuel which flows into the receiving receptacle comprising a printing roller, a record tape, a let-off and take-up device for the tape, means for rendering the same operative when the valve is open, means for printing the record on the tape when the valve is closed, a draw-off delivery pipe, a valve therein, a delivery hose, means for supporting the same, the hose being connected to the valve in the delivery pipe which is opened when the receiving receptacle is filled and means connected to the hose for permitting the recording cylinder to return to its zero position, said valve in the delivery pipe being operated when the liquid in the receiving receptacle reaches a definite level.

12. In a fuel dispensing mechanism, a receiving receptacle, means for permitting a definite quantity of the fuel to enter the receptacle, a draw-off pipe, a valve therein, a plunger in the receptacle, operative connecting means between the valve and the plunger for opening the same when the plunger reaches a definite position, a device for recording the quantity of fuel that enters the receiving receptacle, means for positioning the printing roll of the recording device when the fuel enters the receptacle, and means for effecting the printing of the record when the fuel is drawn off.

13. In combination, in a liquid fuel dispensing system, a receiving receptacle, two piston members therein, means for adjusting the pistons, a draw-off pipe connected to the receptacle, a valve in the pipe, operative connecting means between the valve and the pistons for opening the valve as the pistons are moved by the entrance of the liquid fuel into the receptacle.

14. In combination, in a liquid fuel dispensing system, a receiving receptacle, two piston members therein, means for adjusting the pistons, a draw-off pipe connected to the receptacle, a valve in the pipe, operative connecting means between the valve and the pistons for opening the valve as the pistons are moved by the entrance of the liquid fuel into the receptacle, a supply tank for the fuel, a valve for admitting and shutting off the fuel, a coin device, operative connecting means between the coin device and the supply valve for opening the valve, and means operated by the pistons for closing the supply valve.

15. In a liquid fuel dispensing apparatus, a receiving and measuring receptacle, means for admitting liquid into the same, a tubular member within the receptacle which is formed with openings, pistons for dividing the receptacle into three compartments and which are adjustably secured to and movable with the tubular member when the fuel is admitted into the receptacle, a valve in the tubular member which normally closes the openings but is moved to uncover the openings when a quantity of fuel is admitted into the lower compartment which is greater than its capacity, a coin actuated device for controlling the quantity of the fuel which is to be admitted into the compartments, and means actuated by the pistons for resetting the coin device and for closing the fuel control supply.

16. In a liquid fuel dispensing apparatus, a receiving and measuring receptacle, means for admitting the liquid into the same, a tubular member within the receptacle which is formed with openings, pistons for dividing the receptacle into three compartments and which are adjustably secured to and movable with the tubular member when the fuel is admitted into the receptacle, a valve in the tubular member which normally closes the openings but is moved to uncover the openings when a quantity of fuel is admitted into the lower compartment which is greater than its capacity, a coin actuated device for controlling the quantity of the fuel which is to be admitted into the compartments, means actuated by the pistons for resetting the coin device and for closing the fuel control supply, and means for preventing the actuation of the coin device should a coin of wrong denomination be inserted.

17. In a liquid fuel dispensing apparatus, of a fuel storage tank, a delivery tank, a pipe connecting said tanks, a valve in said pipe, a spring motor, a platform, connecting means between the platform and motor for the purpose of winding said motor when a weight is placed on the platform, connecting means between said motor and valve for the purpose of opening and closing the valve, an escapement device controlling the action of the motor, coin operating means and float operative means in the delivery tank for alternately actuating said escapement device, a flow meter in said connecting pipe, a recording cylinder, raised figures on the periphery of said cylinder, connecting means between said meter and said cylinder for the purpose of revolving the cylinder to bring the proper raised figures into printing position, a record tape comprising two layers of paper and a layer of double faced carbon between the two layers of paper, a printing roll for the purpose of exerting pressure to force said tape against the raised figures on the recording cylinder, thereby, printing said figures on both layers of paper, means controlled by said escapement device and actuated by said spring motor for alternately passing said record tape and said printing roll over said recording cylinder, an outer casing formed with a slot, means for guiding a section of the outer layer of paper through said slot after a record has been printed thereon, a delivery hose, spring actuated levers between said hose and the connecting means between the flow meter and the recording cylinder for the purpose of releasing the recording cylinder from engagement with the flow meter when said hose is removed, a pipe connecting said hose and said delivery tank, a valve in said pipe, and operative means actuated by said float device for opening said valve when the delivery tank is filled.

18. A fuel vending apparatus comprising, in combination, a recording and a fuel measuring device, a recording cylinder, connecting means between the measuring device and the said cylinder, means for disengaging said connecting means when the measuring device is idle for the purpose of permitting the recording cylinder to return to its zero position, figures representing the quantity of fuel entering the apparatus on the surface of said recording cylinder, a record tape, means for placing a fresh section of said tape in recording position against said cylinder, and means for printing the figures on said cylinder on said tape when the cylinder is at rest.

RICHARD J. TALBOT.